United States Patent
Shih (10) Patent No.: US 6,811,173 B1
(45) Date of Patent: Nov. 2, 2004

(54) BABY TRICYCLE STEERING CONTROL ARRANGEMENT

(76) Inventor: Wen-Fu Shih, No. 128, Chung I Road, Je Te Hsiang, Tainan Hsien (TW)

( * ) Notice: Subject to any disclaimer, the term of this patent is extended or adjusted under 35 U.S.C. 154(b) by 0 days.

(21) Appl. No.: 10/702,911

(22) Filed: Nov. 5, 2003

(51) Int. Cl.⁷ ................................................. B62B 3/12
(52) U.S. Cl. ....................................... 280/270; 280/282
(58) Field of Search .............................. 280/47.11, 263, 280/270, 282, 288.4, 296

(56) References Cited

U.S. PATENT DOCUMENTS

| | | | | |
|---|---|---|---|---|
| 5,924,713 A | * | 7/1999 | Li | 280/270 |
| 6,120,048 A | * | 9/2000 | Li | 280/270 |
| 6,530,589 B1 | * | 3/2003 | Ma | 280/278 |
| 6,612,598 B2 | * | 9/2003 | Wu | 280/270 |
| 6,666,470 B2 | * | 12/2003 | Li | 280/282 |

* cited by examiner

Primary Examiner—Lesley D. Morris
Assistant Examiner—L. Lum
(74) Attorney, Agent, or Firm—Pro-Techtor International Services (57) ABSTRACT

A baby tricycle steering control arrangement is disclosed to include a base frame, a head unit and a steering control bar respectively pivoted to the front and rear sides of the base frame, a swivel member pivoted to the pivot between the front side of the base frame and the head unit and fixedly connected to the head unit, a link received in the base frame and coupled between the bottom end of the steering control bar and the swivel member for enabling the head unit to be controlled by the steering control bar, and a spring member coupled between the swivel member and the base frame and adapted to return the head unit to the middle position automatically after release of biasing force from the steering control bar.

1 Claim, 9 Drawing Sheets

BABY TRICYCLE STEERING CONTROL ARRANGEMENT

BACKGROUND OF THE INVENTION

1. Field of the Invention

The present invention relates to baby tricycles and, more specifically, to a baby tricycle steering control arrangement, which keeps the spring member and the link from sight and out of reach of children.

2. Description of the Related Art

Figure 1:
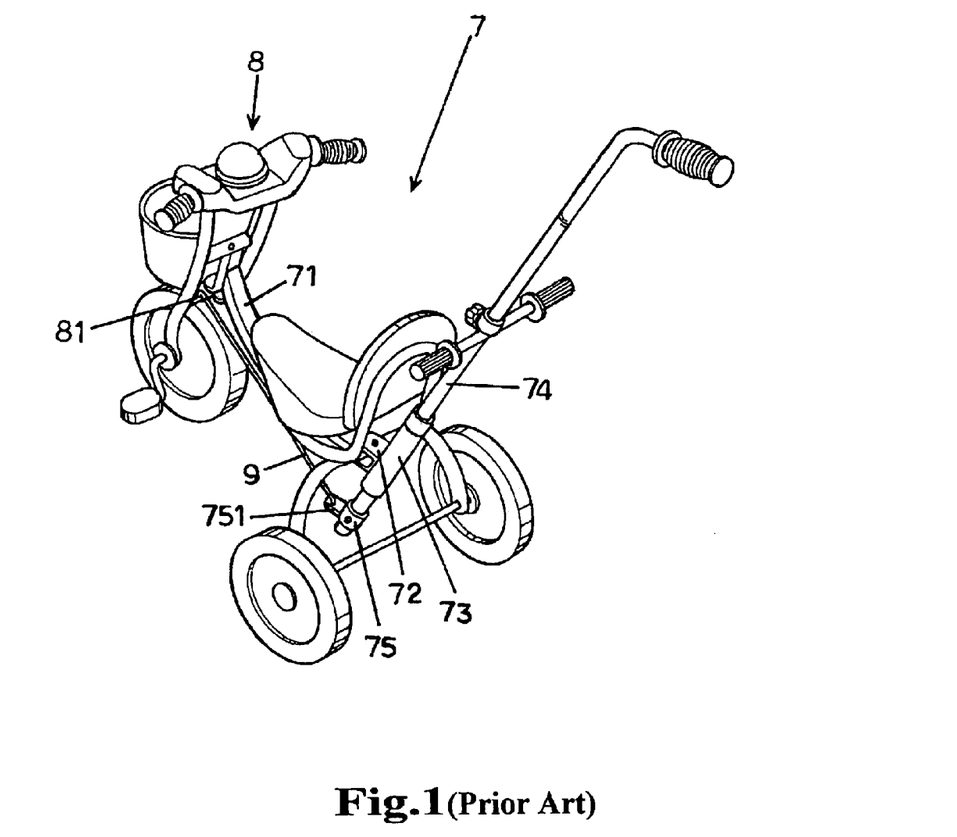
FIG. 1 is a perspective view of a baby tricycle constructed according to the prior art.
Figure 2:
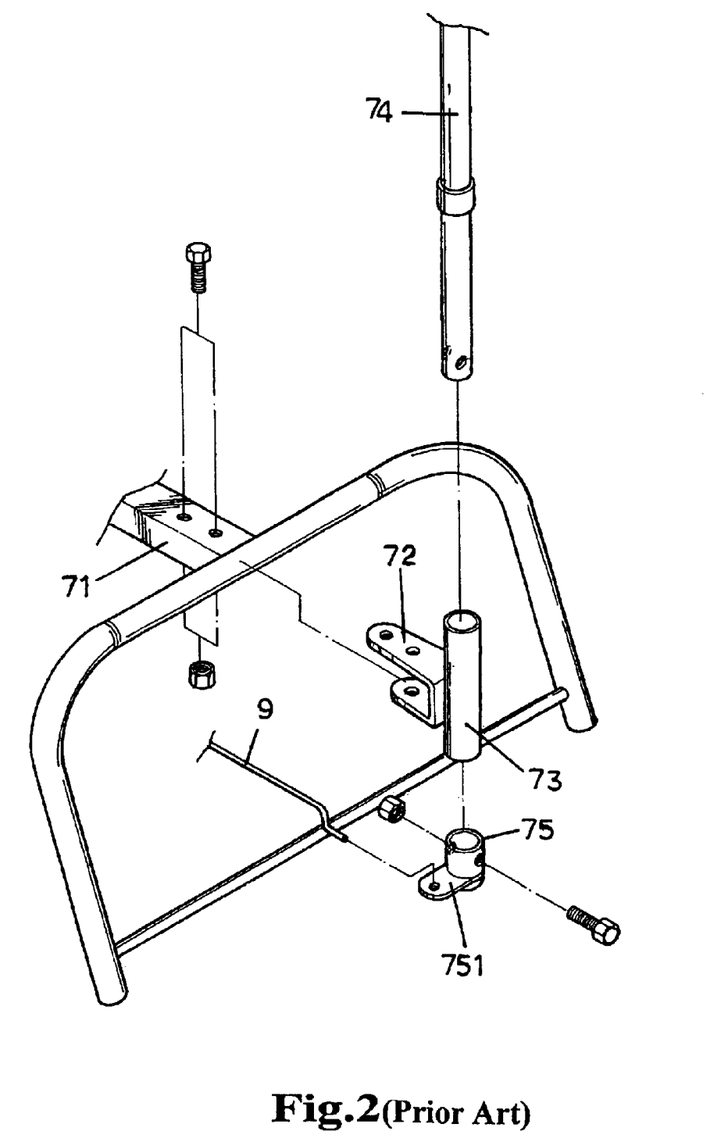
FIG. 2 is an exploded view in an enlarged scale of a rear part of the baby tricycle shown in FIG. 1.
Figure 3:
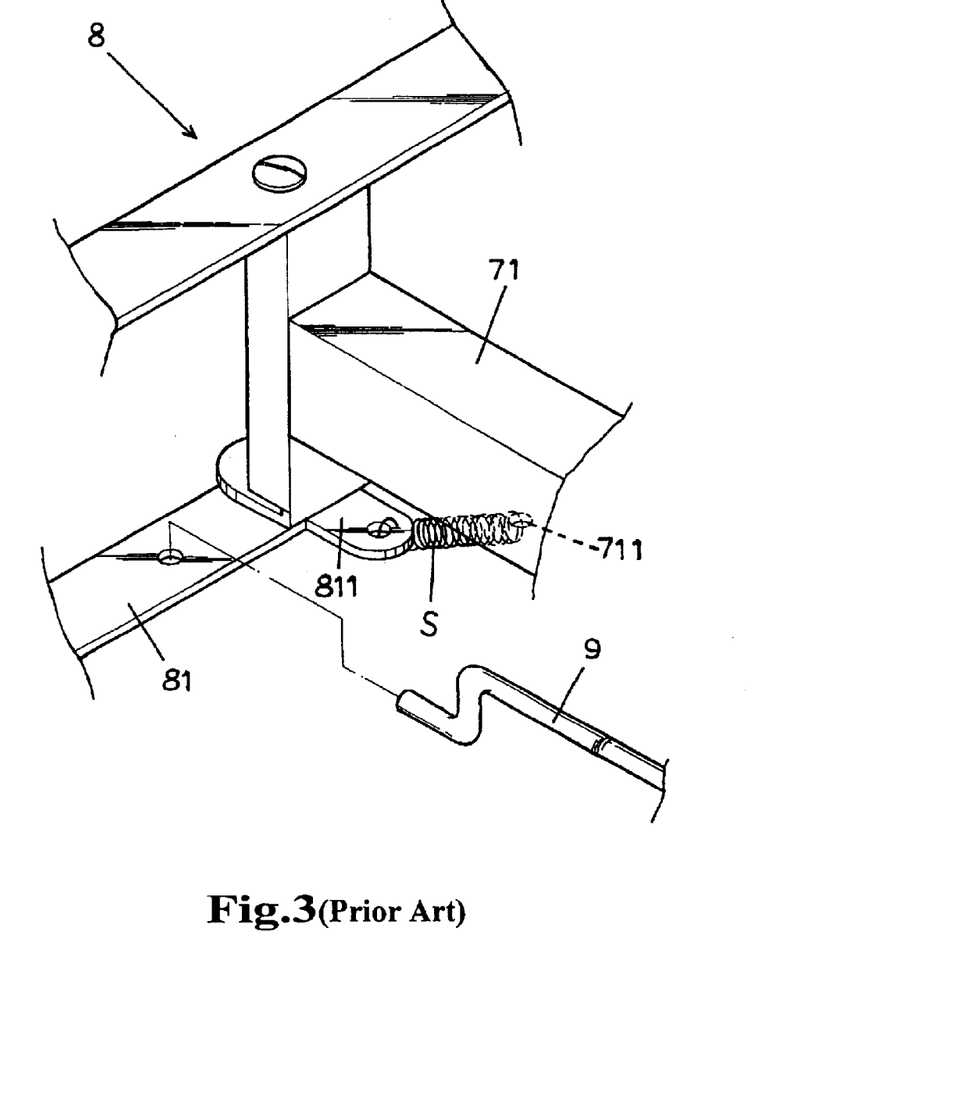
FIG. 3 is an exploded view in an enlarged scale of a front part of the baby tricycle shown in FIG. 1.
Figure 4:
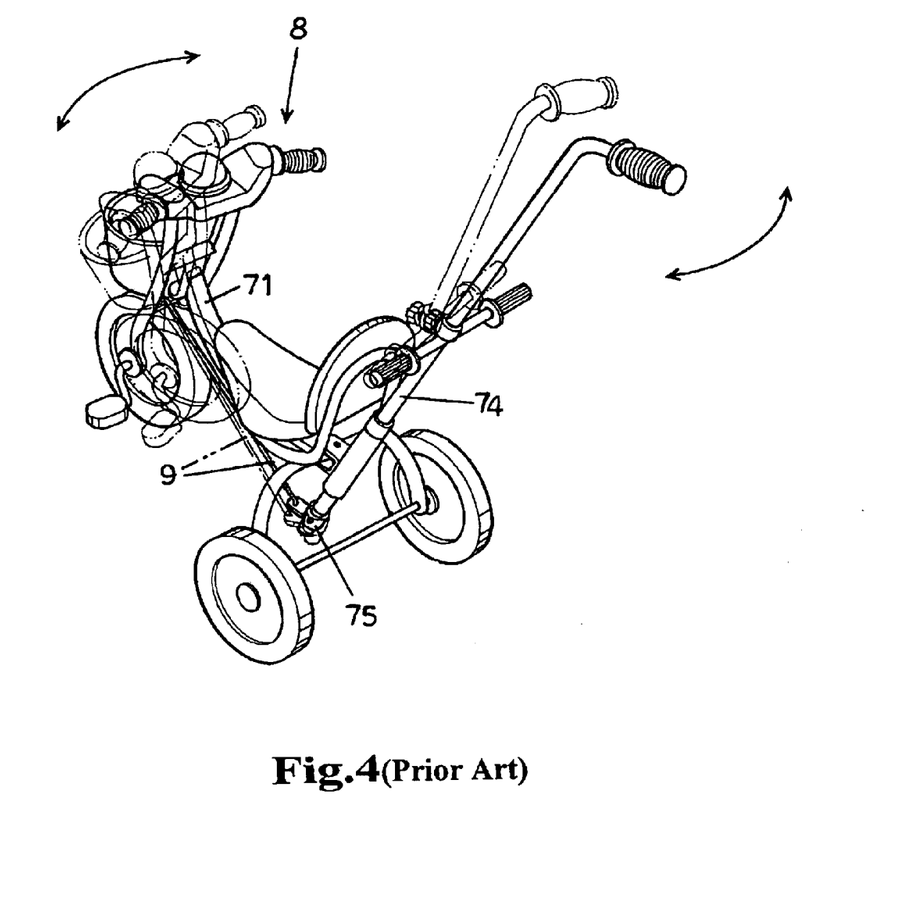
FIG. 4 is a schematic drawing showing a steering control status of the baby tricycle according to the prior art.

A conventional baby tricycle 7, as shown in FIG. 1, comprises a base frame 71, a lug 72 fixedly fastened to the rear side of the base frame 71, a barrel 73 fixedly fastened to the lug 72 in vertical, a steering control bar 74 pivotally coupled to the barrel 73 (see FIG. 2), an end block 75 fixedly fastened to the bottom end of the steering control bar 74 and suspended below the barrel 73, a head unit 8, a transverse bar 81 fixedly provided at the head unit 8 and fastened pivotally with the front side of the base frame 71, a link 9 coupled between a lug 751 at the end block 75 and the transverse bar 81 for enabling the steering control bar 74 to control the steering direction of the head unit 8, and a spring member S connected between a lug 811 at the transverse bar 81 of the head unit 8 and a hole 711 at the base frame 71 (see FIG. 3). When biasing the steering control bar 74, the link 9 is forced to turn the head unit 8 to the left or the right (see FIG. 4). When released the biasing force from the steering control bar 74, the spring member S automatically returns the head unit 8 to the middle position for moving straightly forwards.

This design of baby tricycle steering control arrangement is functional, however it is not safe in use. Because the spring member S and the link 9 are exposed to the outside of the base frame 71, they are not kept out of reach of children. Further, when the baby tricycle fell to the ground, the spring member S and the link 9 tend to be permanently deformed or damaged by an external body.

SUMMARY OF THE INVENTION

The present invention has been accomplished under the circumstances in view.

It is one object of the present invention to provide baby tricycle steering control arrangement, which automatically returns the head unit of the baby tricycle to the middle position after release of bias force from the steering control bar.

It is another object of the present invention to provide baby tricycle steering control arrangement, which is safe in use.

According to one aspect of the present invention, the baby tricycle steering control arrangement comprises a hollow base frame, a head unit and a steering control bar respectively pivoted to the front and rear sides of the base frame, a swivel member pivoted to the pivot between the front side of the base frame and the head unit and fixedly connected to the head unit, a link received in the hollow base frame and coupled between the bottom end of the steering control bar and the swivel member for enabling the head unit to be controlled by the steering control bar, and a spring member, coupled between the swivel member and the base frame and adapted to return the head unit to the middle position automatically after release of biasing force from the steering control bar.

According to another aspect of the present invention, the spring member is received in the hollow base frame, and kept out of reach of children.

DETAILED DESCRIPTION OF THE PREFERRED EMBODIMENT

Figure 5:
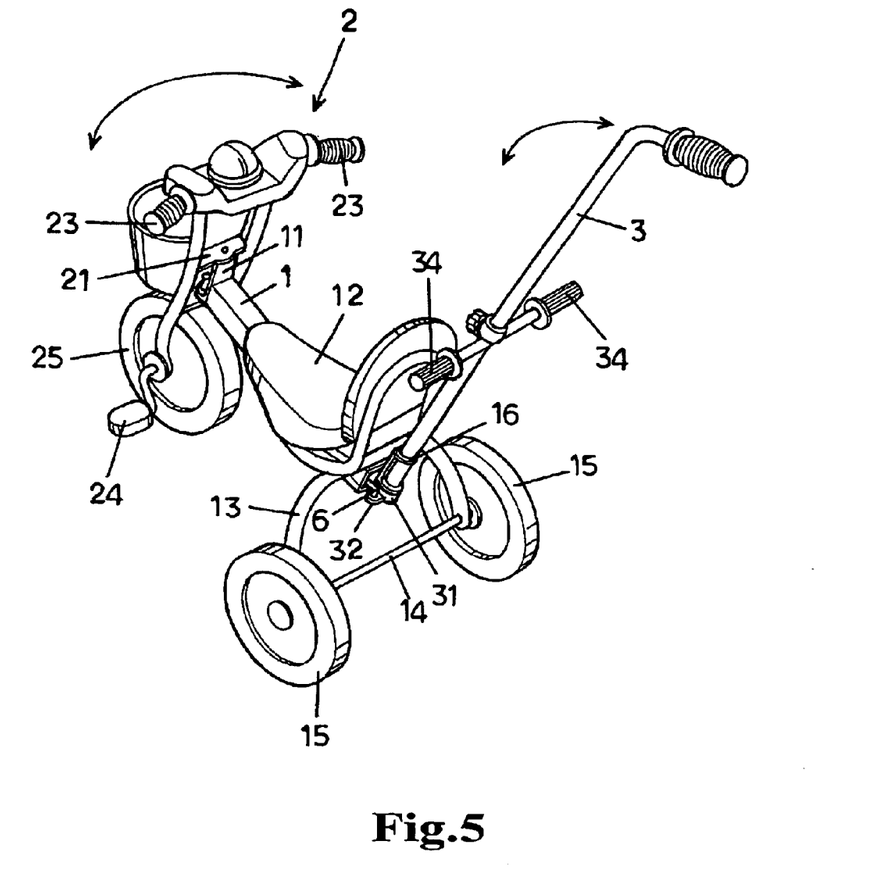
FIG. 5 is a perspective view of a baby tricycle according to the present invention.
Figure 6:
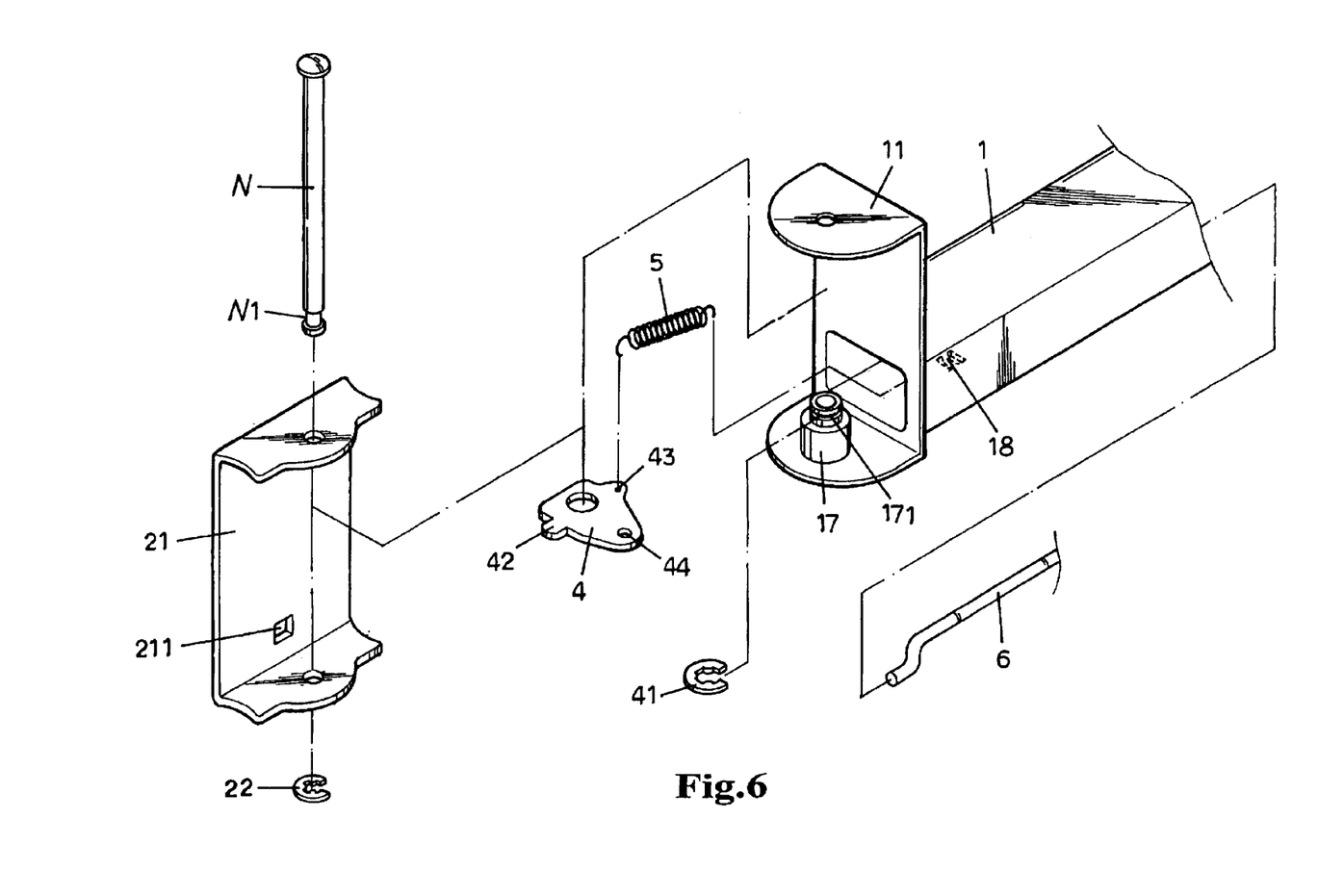
FIG. 6 is an exploded view in an enlarged scale of a front part of the baby tricycle shown in FIG. 5.
Figure 7:
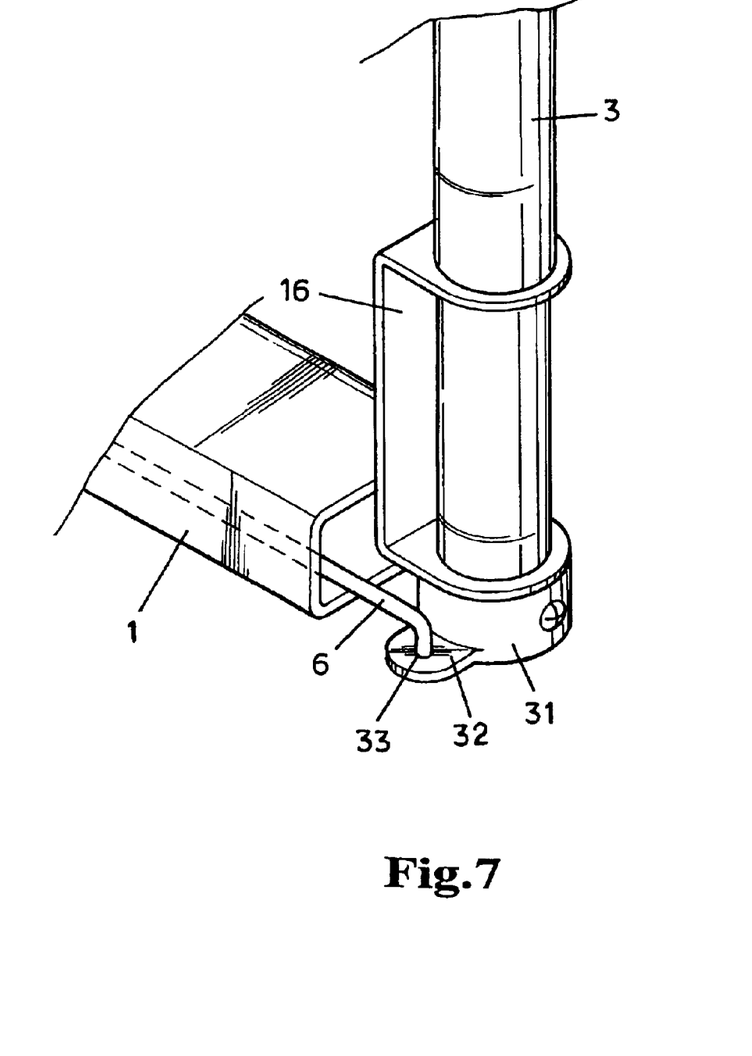
FIG. 7 is a perspective view in an enlarged scale of a rear part of the baby tricycle shown in FIG. 5.

Referring to FIGS. From 5 through 7, a baby tricycle is shown comprising a hollow base frame 1, a head unit 2, and a steering control bar 3 (see FIG. 5). The base frame 1 has a front side fixedly provided with a substantially ⊃-shaped front lug 11, which is coupled to a substantially ⊂-shaped lug 21 at the head unit 2 by a pivot pin N (see FIG. 6). The pivot pin N has a groove N1 extended around the periphery near the rear end. A C-shaped retainer 22 is fastened to the groove N1 of the pivot pin N to secure to the pivot pin N to the lugs 11 and 21. A saddle 12 is fixedly provided at the top side of the base frame 1. The base frame 1 further has a rear side fixedly provided with a smoothly arched rear wheel frame 13, and a substantially ⊂-shaped rear lug 16. The rear wheel frame 13 supports a transversely extended wheel axle 14 and two rear wheels 15 at the ends of the wheel axle 14. The substantially ⊂-shaped rear lug 16 supports the steering control bar 3 (see FIG. 7). The steering control bar 3 has a bottom end fixedly mounted with a locating block 31. The locating block 31 has a peripheral lug 32, which has a through hole 33. The head unit 2 comprises a pair of handlebars 23, a pair of pedals 24, and a front wheel 25. When sitting on the saddle 12, the child holds the handlebars 23 with the hands and then pedals the pedals 24 to move the front wheel 25 and the rear wheels 15.

Figure 8:
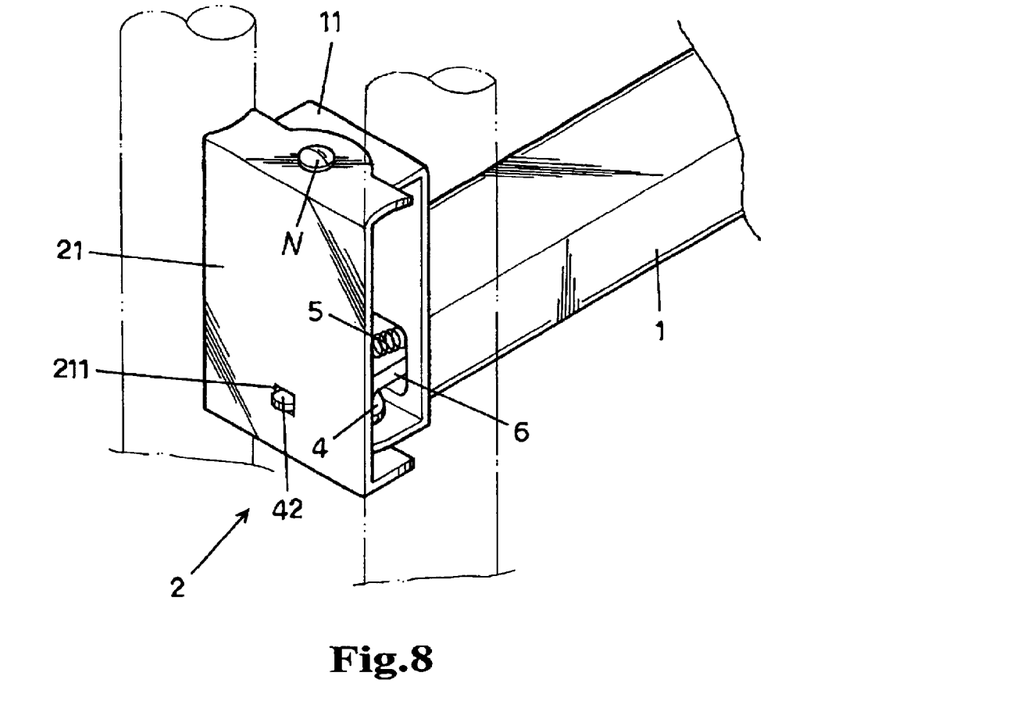
FIG. 8 is an assembly view of FIG. 6.
Figure 9:
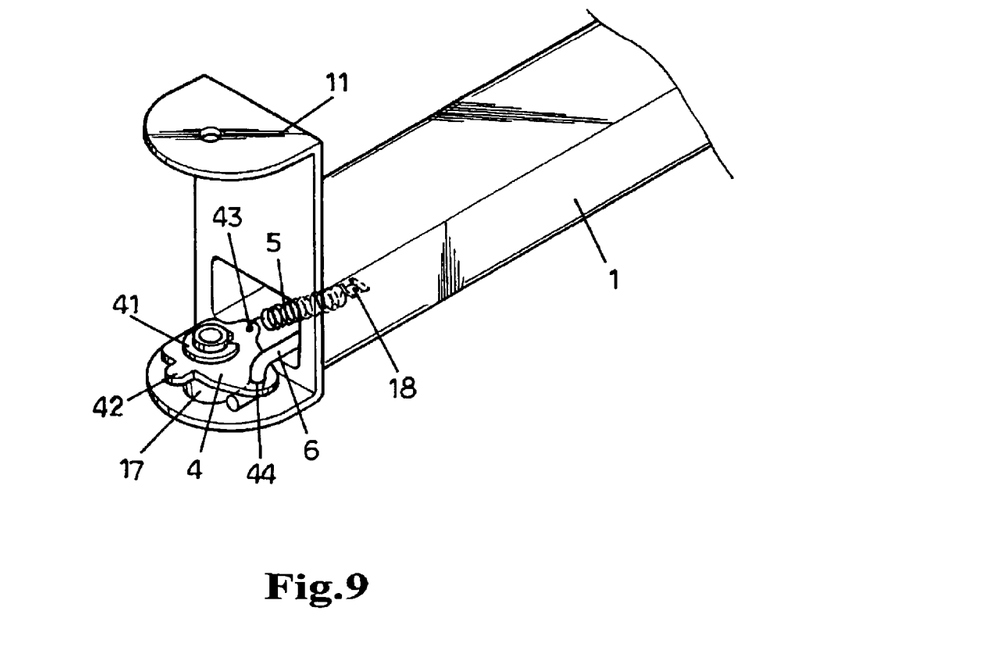
FIG. 9 is another assembly view of FIG. 6 after removal of the ⊂-shaped lug of the head unit.

The aforesaid ⊃-shaped front lug 11 of the base frame 1 has a bottom wall fixedly provided with a socket 17. The socket 17 has a top neck 171. The pivot pin N is inserted through the socket 17. A C-shaped retainer 41 is fastened to the top neck 171 to secure a swivel member 4 to the socket 17. The swivel member 4 has a front projection 42 engaged into a retaining hole 211 at the ⊂-shaped lug 21 of the head unit 2 (see FIG. 8), a rear hook hole 43 connected to a bottom hook rod 18 at the base frame 1 by a spring member 5 (see FIG. 9), and a side through hole 44 equally spaced from the front projection 42 and the rear hook hole 43. A link 6 is longitudinally inserted through the base frame 1 and coupled between the side through hole 44 of the swivel member 4 and the through hole 33 at the peripheral lug 32 of the locating block 31 of the steering control bar 3 (see FIGS. 7 and 9).

Figure 10:
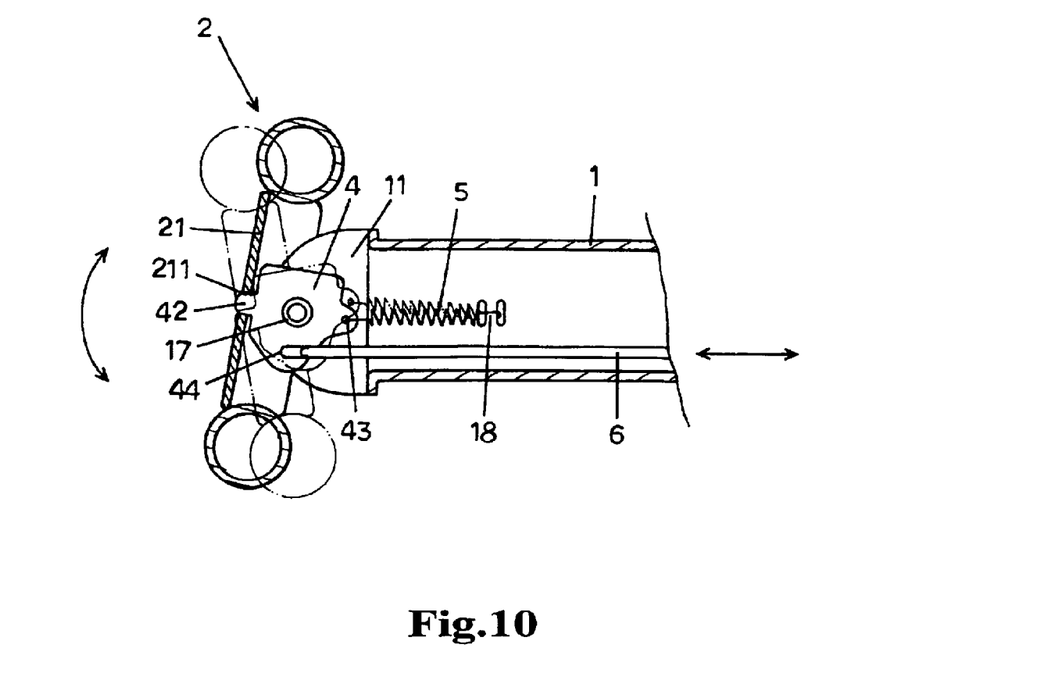
FIG. 10 is a schematic sectional top view, showing a steering control status of the baby tricycle according to the present invention.
Figure 11:
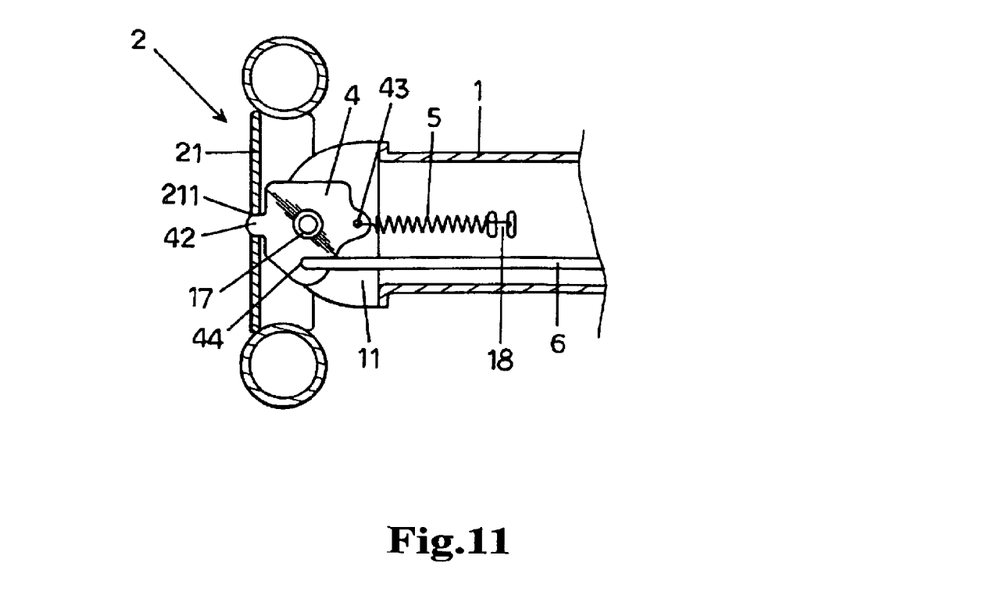
FIG. 11 is a sectional top view showing the head unit returned to the middle position according to the present invention.

When a child riding the baby tricycle, an adult person can hold the steering control bar 3 with the hand and bias the steering control bar 3 leftwards or rightwards to move the link 6 backwards or forwards (see FIG. 10), causing the swivel member 4 to turn the head unit 2 to the left or right. Therefore, through the steering control bar 3, an adult person can help the child control the steering of the baby tricycle. When the adult person released the hand from the steering control bar 3, the spring member 5 automatically pulls the swivel member 4 and the head unit 2 to the middle position (see FIG. 11), for enabling the head unit 2 to be propelled straightly forwards. Further, the steering control bar 3 is fixedly provided with a pair of grips 34 for the holding of the hands of a young child learning to walk.

According to the present invention, the spring member 5 and the link 6 are received inside the base frame 1. Therefore, the base frame 1 protects the spring member 5 and the link 6 against outside object, and keeps the spring member 5 out of reach of children.

Although a particular embodiment of the invention has been described in detail for purposes of illustration, various modifications and enhancements may be made without departing from the spirit and scope of the invention.

What the invention claimed is:

1. A baby tricycle steering control arrangement comprising a hollow base frame,
the base frame having a front lug and a rear lug,
the rear lug being located at a rear of a seat, and,
the front lug including a pivot pin,
a head unit equipped with a front wheel, and
including a lug connected to the pivot pin,
a steering control bar pivotally coupled to the rear lug, and
including a bottom lug,
a link being inserted through the base frame, and coupled
between the bottom lug of the steering control bar and
the head unit for bias,
a bottom socket provided in a bottom wall of the front lug
of the base frame, and coupled to the pivot pin,
a swivel member coupled to the socket,
the swivel member having a front projection engaged in
the following holes,
a hole in the lug of the head unit,
a rear hook hole, and
a side hole that is equally spaced from the front
projection and
rear hook hole,
a spring connected between the rear hook hole, and a
bottom hook rod provided in the base frame, and,
the link further having a front end coupled to the side hole,
and a rear end coupled to the bottom lug of the steering
control bar.

* * * * *